Figure 1:
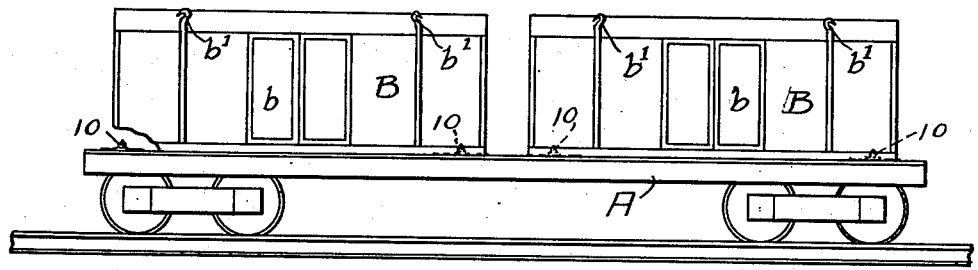

July 21, 1936.    B. F. FITCH    2,047,954
SHOCK ABSORBING MOUNTING FOR DEMOUNTABLE BODIES
Filed Oct. 24, 1932    2 Sheets-Sheet 1

Inventor
Benjamin F. Fitch,
By Bates, Golrick Hears
Attorneys.

July 21, 1936. B. F. FITCH 2,047,954
SHOCK ABSORBING MOUNTING FOR DEMOUNTABLE BODIES
Filed Oct. 24, 1932 2 Sheets-Sheet 2
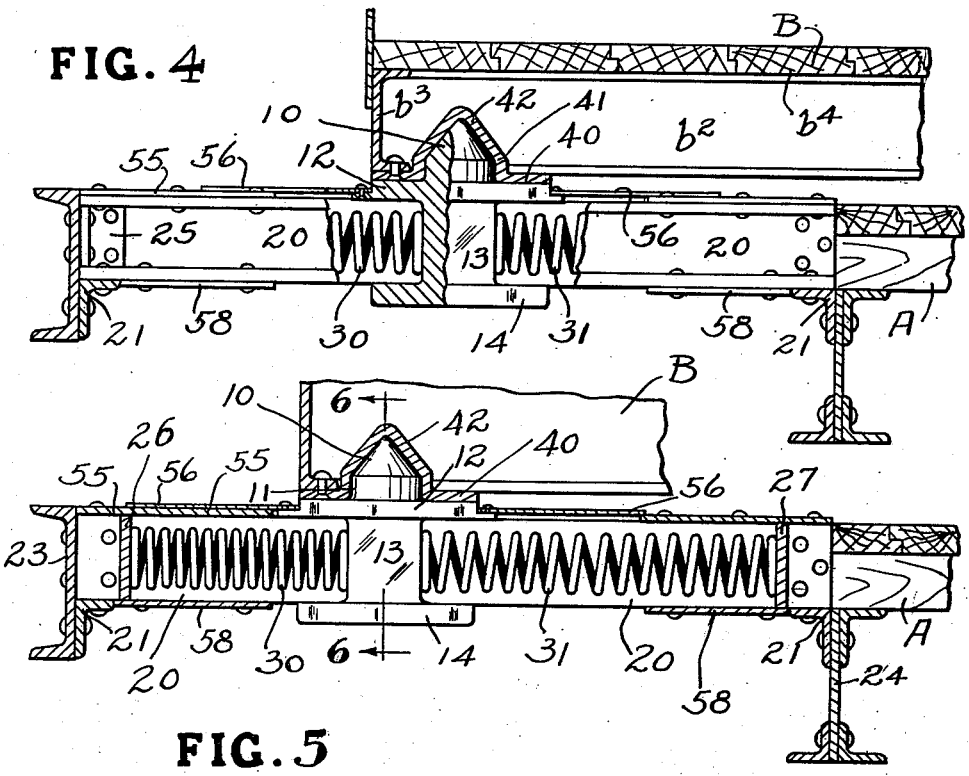
FIG. 4
FIG. 5
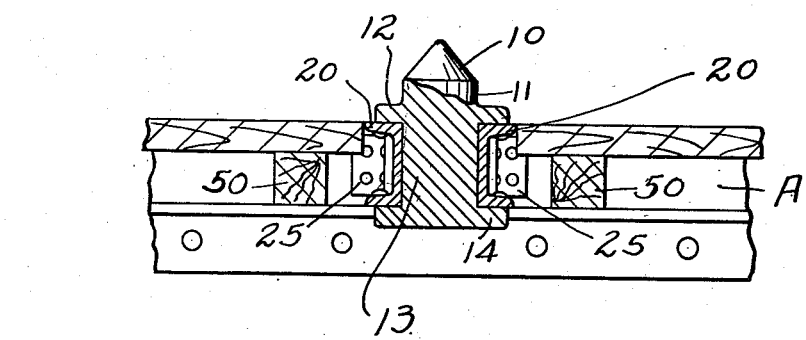
FIG. 6
Inventor
Benjamin F. Fitch,
By Bates, Golrick & Teare
Attorneys Patented July 21, 1936

2,047,954

UNITED STATES PATENT OFFICE 2,047,954

SHOCK ABSORBING MOUNTING FOR DEMOUNTABLE BODIES

Benjamin F. Fitch, Greenwich, Conn., assignor to Motor Terminals Company, New York, N. Y., a corporation of Delaware Application October 24, 1932, Serial No. 639,281

9 Claims. (Cl. 105—366)

This invention relates to the carrying of demountable bodies on vehicles, especially on railway cars. I have developed a system of transporting package freight, which is in satisfactory use, comprising loading it into demountable automobile bodies, placing the body on a highway truck, transporting it to a rail-head, then lifting it and depositing it on suitable anchorages on a railway car and transporting it with other trucks placed on the car to another city for transference there to a truck and ultimate delivery.

Now as railway cars are occasionally subjected to very sudden stoppage, the impact, especially in case of collision, may cause the demountable body to tear loose from its anchorages, or the contents of the body to be injured and in turn injure the body by reason of impact. To obviate this difficulty I have devised a shock absorbing mounting for anchoring the demountable body to the railway car, which constitutes the subject matter of this application.

To the above end, I have provided on the vehicle upwardly extending projections slidably mounted on longitudinal guides and acted on by longitudinally extending restraining springs, these projections being adapted to enter sockets in the base of the demountable truck body. The springs are of sufficient stiffness to hold the body in place for ordinary traffic stresses, but in case of an emergency, resulting in an abrupt stopping of the car, the springs will allow the mounting and body to slide forward sufficiently to take up the shock.

My invention includes this feature broadly, also in the more specific embodiment thereof illustrated in the drawings and hereinafter more fully described.

Figure 2:
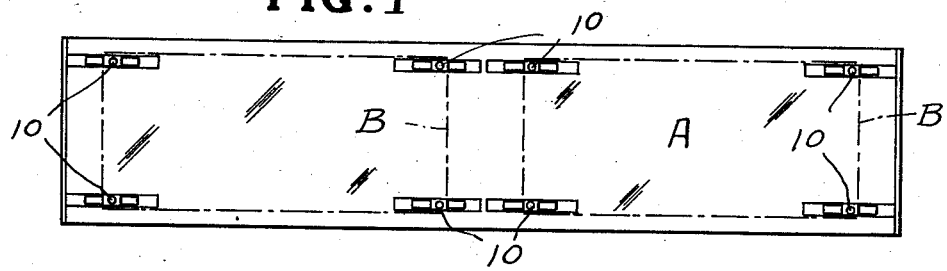
Figure 3:
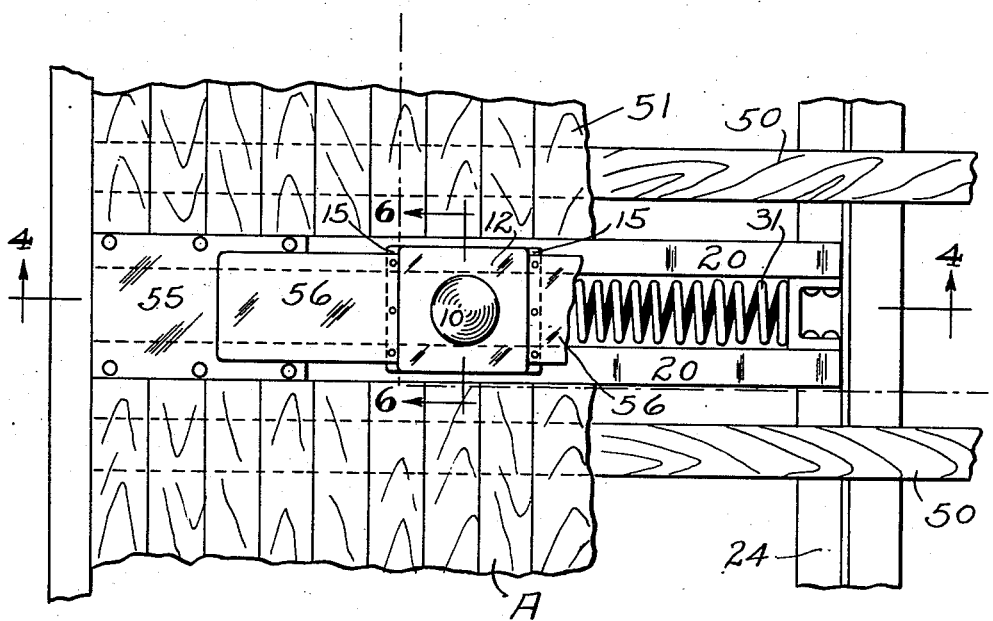

In the drawings, Fig. 1 is a side elevation of a railway car equipped with my shock absorbing mounting and carrying two demountable bodies; Fig. 2 is a plan of the car with the body removed; Fig. 3 is a plan on a larger scale of a portion of the car with parts partly broken away to disclose the shock absorbing mounting more fully; Fig. 4 is a longitudinal section through the shock absorbing mounting as indicated by the lines 4—4 in Fig. 3, this view showing the parts in normal position; Fig. 5 is a view similar to Fig. 4, showing the mounting in its emergency shock-relieving position; Fig. 6 is a vertical cross-section through the mounting, as indicated by the line 6—6 on Fig. 5.

In the drawings "A" indicates an ordinary railway flat car, and "B" demountable bodies adapted to be carried by the car, these bodies having a base, side walls, end walls and a roof, and suitable doors b for loading. Each body is provided adjacent its eaves with a pair of hooks b1 for the attachment of suitable hoisting mechanism to lift the body from a highway truck onto the railway car and vice versa.

The demountable bodies B are preferably of about the maximum size which may be carried on a highway truck, and an ordinary flat car will very conveniently carry two of these bodies placed end to end, as shown in Fig. 1. It is desirable that the shock absorbing positioning devices on the car engage the body adjacent its four corners, and, accordingly, I provide the car with these devices arranged in sets of four, the devices of each set occupying the four corners of a rectangle.

Each shock-absorbing car mounting comprises an upwardly extending projection 10, which is preferably conical at the top and then has a cylindrical portion 11, and then an outwardly extending bearing flange or head 12, with a depending shank 13. These bearing flanges are shown as resting on the longitudinal guideway carried by the car floor frame and comprising two channel beams 20, mounted side by side but spaced apart, the shank extending downwardly between the webs of these beams, and being guided thereby.

The channel beams 20 are shown as carried by suitable cross members of the car floor frame. Thus, they may rest on the angle bars 21 and 22, which are riveted to cross beams 23 and 24 of the car. The webs of the channel beams 20 may also be secured to these cross beams by suitable angle clips 25, or otherwise attached. In any event, the two longitudinal guides 20 are firmly affixed to the frame-work of the car floor.

The downwardly extending shank 13 of the projection may be square in cross section and fill the space between the channel beams 20 and below these channel beams the member may have a flange 14 extending laterally beneath the lower flanges of the beams 20. It follows from this construction that the member 10 is effectively supported by the car floor channel beams and is limited by its engagement with these beams so that its only allowable movement is a longitudinal one.

Between the channel beams on opposite sides of the fastening shank 13 are a pair of stiff compression springs 30 and 31. These bear at their adjacent ends against opposite sides of the shank and at their distant ends against abutments 26 and 27, firmly secured to the two channel beams.

The demountable bodies have sockets in their bases adapted to coact with the upwardly extending portions of the floor projections. As illustrated in Fig. 4, the body B has a base frame composed of side sills b2 and end sills b3 beneath the floor b4. In the corner between the side sills and end sills, I mount the socket 40, which has a horizontal bottom flange secured to the underface of the sills, and then an upwardly extending cylindrical portion 41 above which the socket plate is conically formed, as shown at 42. The socket interior is thus complementary to the portions 10 and 11 of the floor projection and makes an effective connection therewith.

When the body is lowered into place on the car, the lower edge of the socket by engaging the conical portion 10 of the floor projection results in the body being cammed horizontally accurately into position, so that it may be deposited with the cylindrical portion 41 of the socket embracing the cylindrical part 11 of the projection, the body resting on the flange 12 of the floor projection. The projection and socket are thus snugly engaged and the projection becomes anchored to the body.

The bodies are necessarily of considerable weight, especially when loaded, and thus cause a decided downward pressure of the projection collars 12 on the top flanges of the floor beams 20. Accordingly, gravity alone is sufficient to hold the body in place against comparatively slight forces. This holding is augmented by the stiff compression springs 30 and 31, so that the anchorage is normally stationary for ordinary traffic conditions.

Assuming that the car is travelling in the left-hand direction in Figs. 4 and 5, if the car is abruptly stopped, as by colliding with something, the projections will slide forward on the bars 20, compressing the forward springs 30, as shown in Fig. 5, thus relieving the shock to the body and its contents.

It will be noticed from the drawings that my shock absorbing mounting does not interfere with the ordinary car flooring. For instance, I have shown the cross girder 24 as carrying longitudinal wooden stringers 50 on which is mounted floor planking 51. An opening is simply formed in this flooring which is directly above the beams 20 and the space between them. If desired, this opening may be partially covered by metal plates, indicated at 55 in Fig. 3, and the projection 10 may have secured to it plates 56, which slide over the plates 55. The collar 12 of the projection which rests on the floor beams may be provided with end flanges 15 for attachment of these plates 56. The opening therefor made through the floor is maintained practically closed.

The space between the channel beams 20 may also be closed on the underside adjacent its distant ends, as by plates 58, riveted to the under-flanges of the beams. This results in the springs being housed at their outer portions, effectively between the side webs of the beams and the top and bottom plates 55 and 58. At their forward ends, these springs are likewise housed between webs of the channel beams and the projecting top and bottom flanges 12 and 14 of the movable projection. There is no chance, therefore, of the springs being displaced from their proper location.

It will be seen that my shock absorbing mounting is simple in construction; that it carries out the positioning and holding operation between the vehicle and body, by reason of projections on the vehicle and sockets in the floor of the body, as shown and claimed in my Patent No. 1,772,939, and at the same time provides safety devices against injury to the body or contents in case of an emergency stoppage of the car. While I have shown the mounting applied to a railway car, it is evident that it could be used on some other vehicle, as, for instance, a ferry boat, or lighter on the highway truck which transports the body, should occasion arise for such installation.

I claim:

1. In the shock absorbing mounting of the character described, the combination of a vehicle having a floor frame, longitudinal guideways carried thereby, projections slidably mounted in the guideways and extending above the floor, springs acting on opposite sides of the projections, and plates carried by each projection and extending longitudinally over the corresponding guideway to close the space along which the projection may move.

2. The combination with a railway car, having a floor frame, of a guideway carried by said frame and comprising a pair of parallel beams, a projection having a shoulder resting on the beams and a shank extending between them, springs between the beams acting on opposite sides of the shank, and plates secured to shoulders on the projections and extending in opposite directions therefrom to cover the space over the beams and between them along which the projection may travel.

3. The combination, with a vehicle, of a guideway carried thereby comprising a pair of parallel beams, a projection having a shoulder resting on the beams and a shank extending between them, springs between the beams acting on opposite sides of the shank, plates over the beams at their outer portions, and plates on the under side of the beams at their outer portions, said upper and under plates coacting with the beam webs to house the springs.

4. In a car, the combination, with a floor frame, of a guideway carried thereby having a pair of parallel beams spaced apart, a member slidably guided by said beams having a head resting on the upper surface of the beams, a shank extending between the beams and a flange below them, compression springs between the beams bearing at their opposite ends against opposite sides of the shank, and abutments for the outer ends of the springs, said member being so formed that it may engage a cooperating member on a demountable automobile body removably mounted on the car.

5. The combination of a vehicle having a flat load-bearing floor, a longitudinal guideway beneath said floor, a projection slidably mounted on the guideway and extending above the floor, springs in front and behind the projection adapted to resist its movement in either direction, and a demountable body having a socket in its base adapted to coact with the projection.

6. A vehicle, having a flat load-bearing floor, four sets of longitudinal guideways carried by the vehicle beneath the floor, each comprising a pair of parallel beams spaced apart, four projections resting on the beams and having shanks extending between them, the four projections normally occupying the four corners of a rectangle and extending above the floor, and stiff compression springs, two for each guideway, located between the pair of beams and bearing against opposite sides of the projection shank, combined with a demountable truck body having four sockets within its floor frame adjacent the corners thereof, said sockets being adapted to receive said projections when the body is deposited on the vehicle.

7. In a car, the combination with a floor frame of a guideway carried thereby having a pair of parallel beams spaced apart, a projection having a head with an upwardly extending conical member resting on top of the beams, a shank extending between said beams and guidingly carried thereby with two opposite shank faces in engagement therewith and a flange below said beams, compression springs between the beams and bearing at their proximate ends against the other pair of opposite sides of the shank, abutments secured to the beams at the distant ends of the springs, and a device having a socket to receive the conical member to position the device on the car.

8. A railway car having a floor frame, a pair of parallel longitudinal beams secured to the floor frame, and upstanding projection having a conical head with a base flange, resting on the beams, and a shank extending downwardly from the base flange between the beams and a second flange on the bottom of said shank, said projection being adapted to engage a socket in the base of a demountable body above the car floor, and compression springs between the beams stationarily abutted at their distant ends and at their proximate ends bearing on opposite sides of said shank between the flanges.

9. In a combination of the class described, a floor frame having a guideway carried thereby comprising a pair of parallel beams spaced apart, abutments secured between said beams, plates extending across said beams on the top and bottom adjacent the abutments to provide pockets facing each other, a projection having a head with an upwardly extending conical top resting on top of the beam and guided thereby, a shank depending between said beams and provided with pockets opposite respective abutments, compression springs bearing at one end in the pockets adjacent the abutments and at the other end in respective pockets of the projection, whereby a shock-absorbing mounting is provided for said projection, together with a device having a socket adapted to mate with said projection when the device is deposited thereover.

BENJAMIN F. FITCH.